US012140113B2

(12) United States Patent
Ito et al.

(10) Patent No.: US 12,140,113 B2
(45) Date of Patent: Nov. 12, 2024

(54) ELECTROMAGNETIC VALVE MECHANISM AND FUEL PUMP

(71) Applicant: Hitachi Astemo, Ltd., Hitachinaka (JP)

(72) Inventors: Takafumi Ito, Hitachinaka (JP); Kiyotaka Ogura, Hitachinaka (JP); Masashi Nemoto, Hitachinaka (JP); Kenichiro Tokuo, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/280,490

(22) PCT Filed: Feb. 2, 2022

(86) PCT No.: PCT/JP2022/004021
§ 371 (c)(1),
(2) Date: Sep. 6, 2023

(87) PCT Pub. No.: WO2022/249550
PCT Pub. Date: Dec. 1, 2022

(65) Prior Publication Data

US 2024/0159208 A1 May 16, 2024

(30) Foreign Application Priority Data

May 27, 2021 (JP) ................................ 2021-089117

(51) Int. Cl.
*F02M 59/36* (2006.01)
*F02M 59/44* (2006.01)

(52) U.S. Cl.
CPC .......... *F02M 59/366* (2013.01); *F02M 59/44* (2013.01)

(58) Field of Classification Search
CPC ............................ F02M 59/366; F02M 59/44
See application file for complete search history.

(56) References Cited

FOREIGN PATENT DOCUMENTS

| | | | | |
|---|---|---|---|---|
| JP | 20132332 A | * | 1/2013 | |
| JP | 2016-75198 A | | 5/2016 | |
| JP | 20160751198 A | * | 5/2016 | |
| WO | WO-2018221077 A1 | * | 12/2018 | ............. F02M 55/04 |

OTHER PUBLICATIONS

International Search Report (PCT/ISA/210) issued in PCT Application No. PCT/JP2022/004021 dated Apr. 5, 2022 with English translation (4 pages).
Japanese-language Written Opinion (PCT/ISA/237) issued in PCT Application No. PCT/JP2022/004021 dated Apr. 5, 2022 with English translation (7 pages).

* cited by examiner

*Primary Examiner* — Jacob M Amick
*Assistant Examiner* — Charles J Brauch
(74) *Attorney, Agent, or Firm* — Crowell & Moring LLP

(57) ABSTRACT

The present invention suppresses wear of a rod or a component with which the rod is in contact. An electromagnetic suction valve mechanism (electromagnetic valve mechanism) includes a suction valve (valve body), a rod engaged with the suction valve, and a magnetic attraction force generation unit that generates a magnetic attraction force for moving the rod in an axial direction. The rod is provided with a low friction portion. The low friction portion is set to a friction coefficient such that a frictional force generated between the rod and the rod contact component with which the rod is in contact is smaller than a rotational propulsive force of the rod.

9 Claims, 9 Drawing Sheets

ELECTROMAGNETIC VALVE MECHANISM AND FUEL PUMP

TECHNICAL FIELD

The present invention relates to an electromagnetic valve mechanism having a sliding component, and a fuel pump including the electromagnetic valve mechanism.

BACKGROUND ART

An electromagnetic valve mechanism of a fuel pump is described in PTL 1, for example. An electromagnetic suction valve mechanism described in PTL 1 includes a rod and an anchor portion that are movable portions, a rod guide that is a fixed portion, an outer core, a fixed core, a rod biasing spring, and an anchor biasing spring.

The rod and the anchor portion which are the movable portions are provided as separate members. The rod is slidably held in an axial direction on the inner peripheral side of the rod guide. The inner peripheral side of the anchor portion is slidably held on the outer peripheral side of the rod. The rod and the anchor portion are configured to be slidable in the axial direction within a geometrically regulated range.

CITATION LIST

Patent Literature

PTL 1: WO 2018/221077 A

SUMMARY OF INVENTION

Technical Problem

However, in the electromagnetic suction valve mechanism described in PTL 1, due to frictional force and collision force generated at a portion where the rod and the anchor portion which are the movable portions come into contact with each other, wear may occur at a portion where the rod and the anchor portion come into contact with each other.

The rod and the anchor portion are rotatable about an axis extending in a sliding direction. However, due to influences of a magnetic attraction force generated between the anchor portion and the fixed core, the anchor portion may be biased in one direction in a radial direction, and rotation thereof may be suppressed.

Meanwhile, rotation of the rod is suppressed by sliding collision with the anchor portion. Therefore, the rod and the anchor portion always repeat sliding collision at the same portion, and wear is promoted. In addition, wear of the same portion causes uneven wear, and the rod and the anchor portion may impair functions thereof.

In consideration of the above problems, an object of the present invention is to provide an electromagnetic valve mechanism and a fuel pump capable of suppressing wear of a rod or a component with which the rod comes into contact.

Solution to Problem

In order to solve the above problems and achieve the object of the present invention, an electromagnetic valve mechanism of the present invention includes a valve body, a rod that engages with the valve body, and a magnetic attraction force generation unit that generates a magnetic attraction force for moving the rod in an axial direction. At least one of the rod and a rod contact component in contact with the rod is provided with a low friction portion. The low friction portion is set to a friction coefficient such that a frictional force generated between the rod and the rod contact component is smaller than a rotational propulsive force of the rod.

Moreover, a fuel pump of the present invention includes a body that includes a pressurizing chamber, a plunger that is supported by the body in a reciprocating manner and increases or decreases a capacity of the pressurizing chamber by a reciprocating movement, and the electromagnetic valve mechanism that discharges a fuel to the pressurizing chamber.

Advantageous Effects of Invention

According to the electromagnetic valve mechanism and the fuel pump having the above-described configurations, it is possible to suppress wear of the rod or the component with which the rod comes into contact.

Problems, configurations, and effects other than those described above will be clarified by the following description of the embodiments.

DESCRIPTION OF EMBODIMENTS

1. First Embodiment

Figure 1:
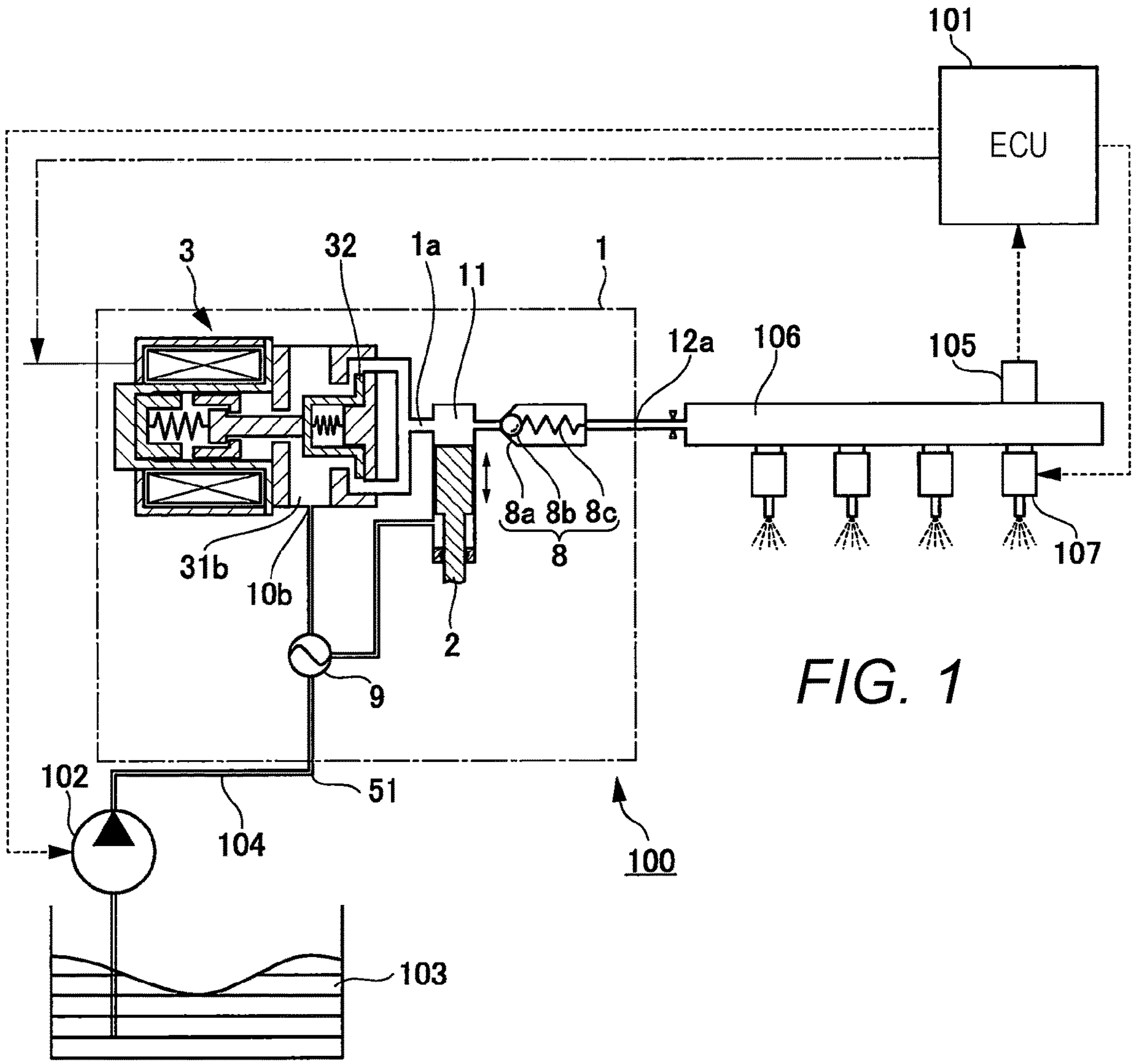
FIG. 1 is an overall configuration diagram of a fuel supply system using a high-pressure fuel supply pump according to a first embodiment of the present invention.

Hereinafter, an electromagnetic valve mechanism and a high-pressure fuel supply pump according to a first embodiment of the present invention will be described. In the drawings, the same members are denoted by the same reference numerals.

[Fuel Supply System]

Next, a fuel supply system using the high-pressure fuel supply pump (fuel pump) according to the present embodiment will be described with reference to FIG. 1.

FIG. 1 is an overall configuration diagram of the fuel supply system using the high-pressure fuel supply pump according to the present embodiment.

As illustrated in FIG. 1, the fuel supply system includes a high-pressure fuel supply pump (fuel pump) 100, an engine control unit (ECU) 101, a fuel tank 103, a common rail 106, and a plurality of injectors 107. The components of the high-pressure fuel supply pump 100 are integrated into a pump body 1 (hereinafter, it is referred to as a "body 1").

A fuel in the fuel tank 103 is pumped up by a feed pump 102 that is driven based on a signal from the ECU 101. The pumped fuel is pressurized to an appropriate pressure by a pressure regulator (not illustrated) and sent to a low-pressure fuel suction port 51 of the high-pressure fuel supply pump 100 through a low-pressure pipe 104.

The high-pressure fuel supply pump 100 pressurizes a fuel supplied from the fuel tank 103 and pressure-feeds the fuel to the common rail 106. The plurality of injectors 107 and a fuel pressure sensor 105 are mounted on the common rail 106. The plurality of injectors 107 is mounted in accordance with the number of cylinders (combustion chambers), and injects fuel according to a drive current output from the ECU 101. The fuel supply system of the present embodiment is a so-called direct injection engine system in which the injector 107 directly injects fuel into a cylinder of the engine.

The fuel pressure sensor 105 outputs the detected pressure data to the ECU 101. The ECU 101 calculates an appropriate injection fuel amount (target injection fuel length), an appropriate fuel pressure (target fuel pressure), and the like based on engine state quantities (for example, a crank rotation angle, a throttle opening, an engine speed, a fuel pressure, and the like) obtained from various sensors.

In addition, the ECU 101 controls driving of the high-pressure fuel supply pump 100 and the plurality of injectors 107 based on a calculation result of the fuel pressure (target fuel pressure) and the like. That is, the ECU 101 includes a pump control unit that controls the high-pressure fuel supply pump 100 and an injector control unit that controls the injector 107.

The high-pressure fuel supply pump 100 includes a pressure pulsation reduction mechanism 9, an electromagnetic suction valve mechanism (electromagnetic valve mechanism) 3 which is a variable capacity mechanism, a relief valve mechanism 4 (see FIG. 2), and a discharge valve mechanism 8. The fuel flowing in from the low-pressure fuel suction port 51 reaches a suction port 31*b* of the electromagnetic suction valve mechanism 3 via the pressure pulsation reduction mechanism 9 and a suction passage 10*b*.

The fuel flowing into the electromagnetic suction valve mechanism 3 passes through a suction valve 32, flows through a suction passage 1*a* formed in the body 1, and then flows into the pressurizing chamber 11. The plunger 2 is inserted into the pressurizing chamber 11 in a reciprocating manner. Power is transmitted to the plunger 2 by a cam 91 (see FIG. 2) of an engine so that the plunger 2 reciprocates.

In the pressurizing chamber 11, the fuel is sucked from the electromagnetic suction valve mechanism 3 in a downward stroke of the plunger 2, and the fuel is pressurized in an upward stroke. When the fuel pressure in the pressurizing chamber 11 exceeds a predetermined value, the discharge valve mechanism 8 is opened, and the high-pressure fuel is pressure-fed to the common rail 106 via a fuel discharge port 12*a*. The fuel discharge by the high-pressure fuel supply pump 100 is operated by opening and closing the electromagnetic suction valve mechanism 3. The opening and closing of the electromagnetic suction valve mechanism 3 is controlled by the ECU 101.

[High-Pressure Fuel Supply Pump]

Next, a configuration of the high-pressure fuel supply pump 100 will be described with reference to FIGS. 2 to 4.

Figure 2:
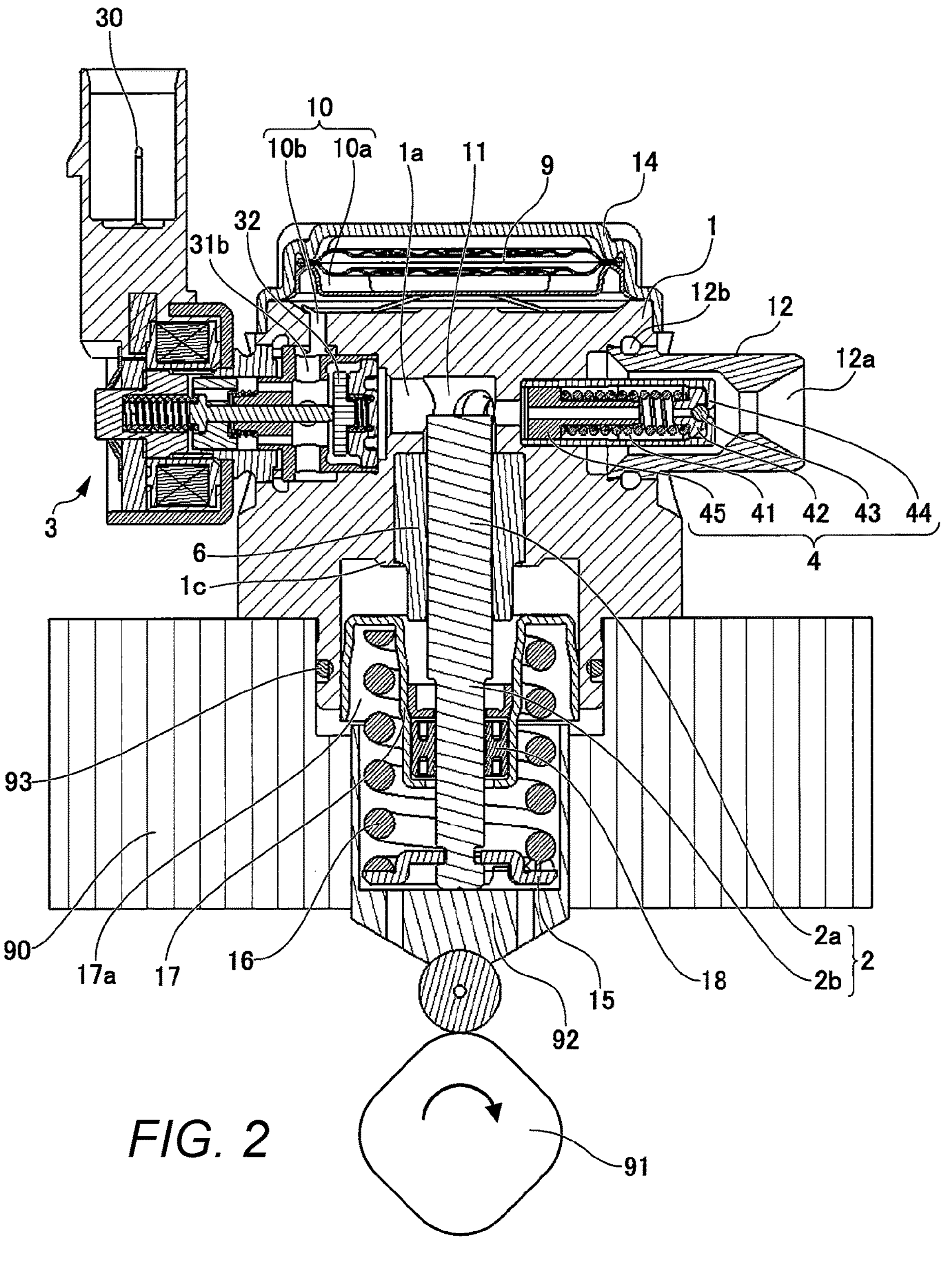
FIG. 2 is a longitudinal cross-sectional view (part 1) of the high-pressure fuel supply pump according to the first embodiment of the present invention.

FIG. 2 is a longitudinal cross-sectional view (part 1) of the high-pressure fuel supply pump 100 as viewed in a cross section orthogonal to a horizontal direction. FIG. 3 is a horizontal cross-sectional view of the high-pressure fuel supply pump 100 as viewed in a cross section orthogonal to a vertical direction. FIG. 4 is a longitudinal cross-sectional view (part 2) of the high-pressure fuel supply pump 100 as viewed in a cross section orthogonal to the horizontal direction.

Figure 3:
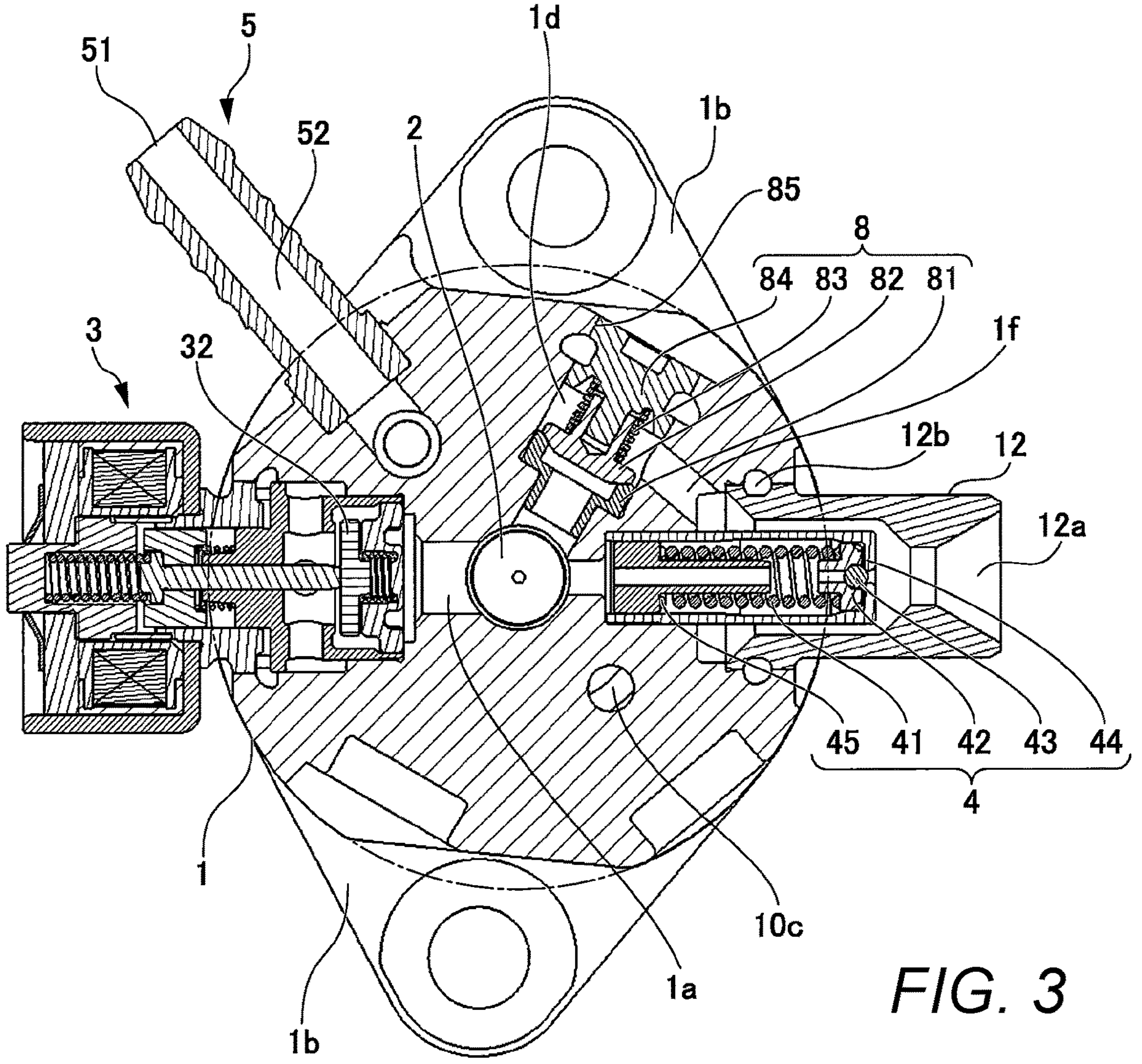
FIG. 3 is a horizontal cross-sectional view of the high-pressure fuel supply pump according to the first embodiment of the present invention as viewed from above.

As illustrated in FIGS. 2 and 3, the body 1 of the high-pressure fuel supply pump 100 is provided with the suction passage 1*a* and an attachment flange 1*b* (see FIG. 3) described above. The attachment flange 1*b* is in close contact with a fuel pump attachment portion 90 of an engine (internal combustion engine) and is fixed with a plurality of bolts (screws) (not illustrated). That is, the high-pressure fuel supply pump 100 is fixed to the fuel pump attachment portion 90 by the attachment flange 1*b*.

Figure 4:
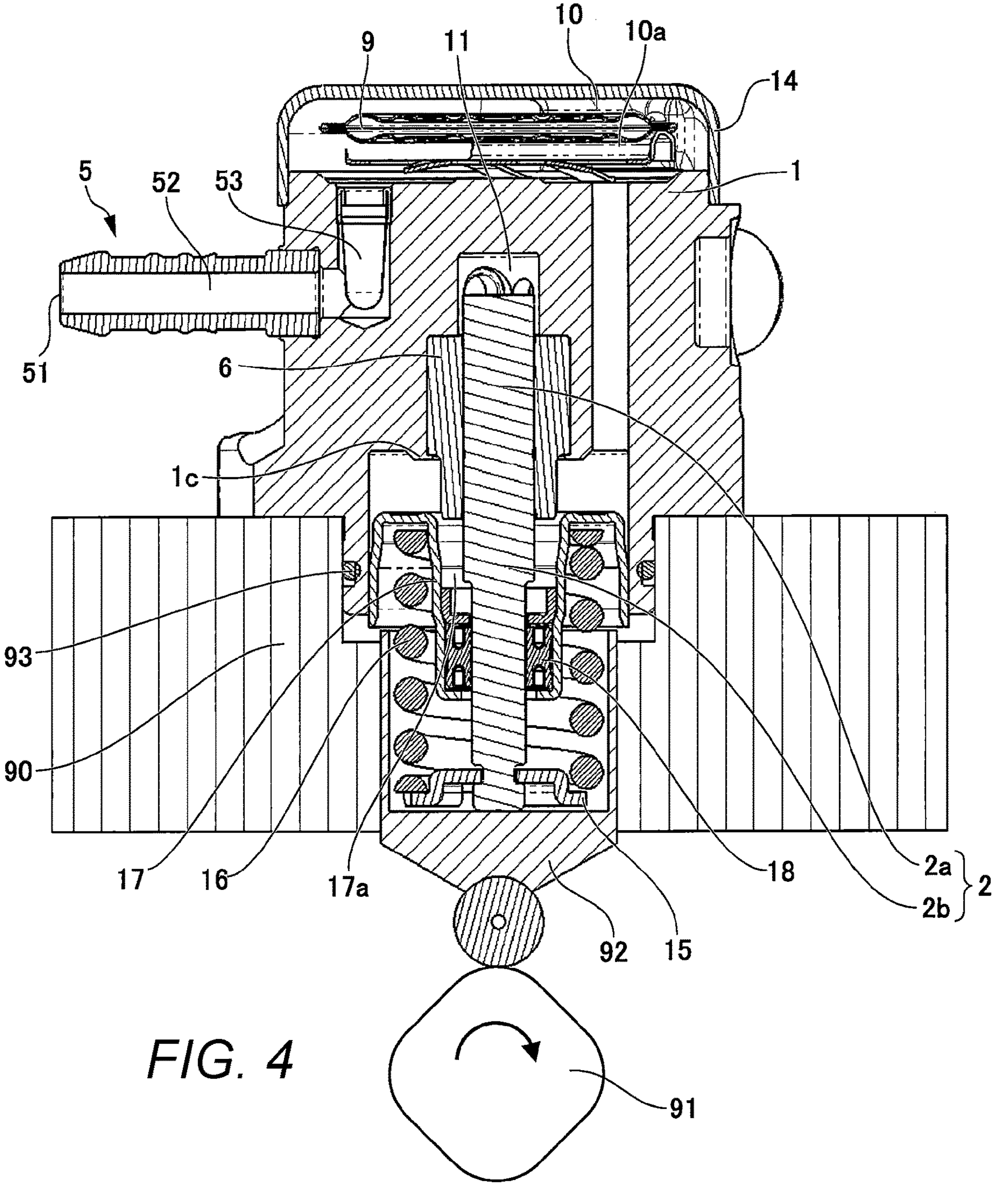
FIG. 4 is a longitudinal cross-sectional view (part 2) of the high-pressure fuel supply pump according to the first embodiment of the present invention.

As shown in FIGS. 2 and 4, an O-ring 93 showing a specific example of a seat member is interposed between the fuel pump attachment portion 90 and the body 1. The O-ring 93 prevents engine oil from leaking to the outside of the engine (internal combustion engine) through between the fuel pump attachment portion 90 and the body 1.

A cylinder 6 that guides the reciprocating movement of the plunger 2 is attached to the body 1 of the high-pressure fuel supply pump 100. The cylinder 6 is formed in a tubular shape, and is press-fitted into the body 1 on the outer peripheral side thereof. The body 1 and the cylinder 6 form the pressurizing chamber 11 together with the electromagnetic suction valve mechanism 3, the plunger 2, and the discharge valve mechanism 8 (see FIG. 3).

The body 1 is provided with a fixed portion 1*c* that engages with a central portion of the cylinder 6 in the axial direction.

The fixed portion 1*c* of the body 1 is plastically deformed by a load applied from a lower side (lower side in FIG. 2), and presses the cylinder 6 upward. As a result, the cylinder 6 is press-fitted into the body 1. As a result, the fuel pressurized in the pressurizing chamber 11 can be prevented from leaking from between the cylinder 6 and the body 1.

A tappet 92 is provided at a lower end of the plunger 2. The tappet 92 converts a rotational movement of a cam 91 attached to a cam shaft of the engine into a vertical movement and transmits the vertical movement to the plunger 2. The plunger 2 is biased toward the cam 91 side by a spring 16 via a retainer 15, and is crimped to the tappet 92. The tappet 92 reciprocates with the rotation of the cam 91. The plunger 2 reciprocates together with the tappet 92 to change a volume of the pressurizing chamber 11.

A seal holder 17 is disposed between the cylinder 6 and the retainer 15. The seal holder 17 is formed in a tubular shape into which the plunger 2 is inserted, and has an auxiliary chamber 17*a* at an upper end portion on the cylinder 6 side. In addition, the seal holder 17 holds a plunger seal 18 at a lower end portion on the retainer 15 side.

The plunger seal 18 is slidably in contact with an outer periphery of the plunger 2. When the plunger 2 reciprocates, the plunger seal 18 seals the fuel in the auxiliary chamber 17*a* so that the fuel in the auxiliary chamber 17*a* does not flow into the engine. The plunger seal 18 prevents a lubricating oil (including engine oil) that lubricates a sliding portion in the engine from flowing into the body 1.

In FIG. 2, the plunger 2 reciprocates in the vertical direction. When the plunger 2 descends, the volume of the pressurizing chamber 11 increases, and when the plunger 2 ascends, the volume of the pressurizing chamber 11 decreases.

That is, the plunger 2 is disposed to reciprocate in a direction of enlarging and reducing the volume of the pressurizing chamber 11.

The plunger 2 has a large diameter portion 2*a* and a small diameter portion 2*b*. When the plunger 2 reciprocates, the large diameter portion 2*a* and the small diameter portion 2*b* are located in the auxiliary chamber 17*a*. Therefore, the volume of the auxiliary chamber 17*a* increases or decreases by the reciprocation of the plunger 2.

The auxiliary chamber 17*a* communicates with a low-pressure fuel chamber 10 through a fuel passage 10*c* (see FIG. 3). When the plunger 2 descends, the fuel flows from the auxiliary chamber 17*a* to the low-pressure fuel chamber 10, and when the plunger 2 ascends, the fuel flows from the low-pressure fuel chamber 10 to the auxiliary chamber 17*a*. As a result, a fuel flow rate into and out of the pump in a suction stroke or a return stroke of the high-pressure fuel supply pump 100 can be reduced, and pressure pulsation generated in the high-pressure fuel supply pump 100 can be reduced.

As illustrated in FIGS. 3 and 4, a suction joint 5 is attached to a side surface portion of the body 1. The suction joint 5 is connected to the low-pressure pipe 104 (see FIG. 1) through which the fuel supplied from the fuel tank 103 passes. The fuel in the fuel tank 103 is supplied from the suction joint 5 to the inside of the high-pressure fuel supply pump 100.

The suction joint 5 includes the low-pressure fuel suction port 51 connected to the low-pressure pipe 104 and a suction flow path 52 communicating with the low-pressure fuel suction port 51. The fuel that has passed through the suction flow path 52 reaches the suction port 31*b* (see FIG. 2) of the electromagnetic suction valve mechanism 3 via the pressure pulsation reduction mechanism 9 and the suction passage 10*b* (see FIG. 2) provided in the low-pressure fuel chamber 10. As illustrated in FIG. 4, a suction filter 53 is disposed in the fuel passage communicating with the suction flow path 52. The suction filter 53 removes foreign substances present in the fuel and prevents the foreign substances from entering the high-pressure fuel supply pump 100.

As illustrated in FIGS. 2 and 4, the body 1 of the high-pressure fuel supply pump 100 is provided with the low-pressure fuel chamber (damper chamber) 10. The low-pressure fuel chamber 10 is covered with a damper cover 14. The damper cover 14 is formed in, for example, a tubular shape (cup shape) with one side closed.

As illustrated in FIG. 2, the low-pressure fuel chamber 10 includes a low-pressure fuel flow path 10*a* and a suction passage 10*b*. The suction passage 10*b* communicates with the suction port 31*b* of the electromagnetic suction valve mechanism 3. The fuel that has passed through the low-pressure fuel flow path 10*a* reaches the suction port 31*b* of the electromagnetic suction valve mechanism 3 via the suction passage 10*b*.

A pressure pulsation reduction mechanism 9 is provided in the low-pressure fuel flow path 10*a*. When the fuel flowing into the pressurizing chamber 11 is returned to the suction passage 10*b* (see FIG. 2) through the electromagnetic suction valve mechanism 3 in a valve open state again, pressure pulsation occurs in the low-pressure fuel chamber 10. The pressure pulsation reduction mechanism 9 reduces spreading of the pressure pulsation generated in the high-pressure fuel supply pump 100 to the low-pressure pipe 104.

The pressure pulsation reduction mechanism 9 is formed of a metal diaphragm damper in which two corrugated disk-shaped metal plates are bonded to each other at the outer peripheries thereof, and an inert gas such as argon is injected into the metal diaphragm damper. The metal diaphragm damper of the pressure pulsation reduction mechanism 9 expands and contracts to absorb or reduce the pressure pulsation.

As illustrated in FIG. 3, the body 1 is provided with the discharge valve mechanism 8 communicating with the pressurizing chamber 11. The discharge valve mechanism 8 includes a discharge valve seat member 81 and a discharge valve 82 that comes into contact with and separates from the discharge valve seat member 81. The discharge valve mechanism 8 includes a discharge valve spring 83 that biases the discharge valve 82 toward the discharge valve seat member 81 side, and a discharge valve stopper 84 that determines a stroke (moving distance) of the discharge valve 82. The discharge valve stopper 84 and the body 1 are joined by welding at an abutment portion 85.

The discharge valve seat member 81, the discharge valve 82, the discharge valve spring 83, and the discharge valve stopper 84 are housed in a discharge valve chamber 1*d* formed in the body 1. The discharge valve chamber 1*d* is a substantially columnar space extending in the horizontal direction. One end of the discharge valve chamber 1*d* communicates with the pressurizing chamber 11 via a fuel passage 1*e*. The other end of the discharge valve chamber 1*d* opens to a side surface of the body 1. An opening at the other end of the discharge valve chamber 1*d* is sealed by the discharge valve stopper 84.

The discharge joint 12 is joined to the body 1 by a welded portion 12*b*. The discharge joint 12 has the fuel discharge port 12*a*. The fuel discharge port 12*a* communicates with the discharge valve chamber 1*d* via a discharge passage if extending in the horizontal direction inside the body 1. The fuel discharge port 12*a* of the discharge joint 12 is connected to the common rail 106 (see FIG. 1).

In a state where there is no difference in fuel pressure between the pressurizing chamber 11 and the discharge valve chamber 1*d*, the discharge valve 82 is pressed against the discharge valve seat member 81 by the biasing force of the discharge valve spring 83. As a result, the discharge valve mechanism 8 enters a valve closing state. When the fuel pressure in the pressurizing chamber 11 becomes larger than the fuel pressure in the discharge valve chamber 1*d*, the discharge valve 82 moves against the biasing force of the discharge valve spring 83 and separates from the discharge valve seat member 81. As a result, the discharge valve mechanism 8 enters a valve open state.

When the discharge valve mechanism 8 is opened, the high-pressure fuel in the pressurizing chamber 11 is discharged to the common rail 106 (see FIG. 1) via the discharge valve chamber 1*d*, the discharge passage 1*f*, and the fuel discharge port 12*a*. In the opened state of the discharge valve mechanism 8, the discharge valve 82 comes into contact with the discharge valve stopper 84, and the stroke of the discharge valve 82 is limited.

The stroke of the discharge valve 82 is appropriately determined by the discharge valve stopper 84. As a result, it is possible to prevent closing delay of the discharge valve mechanism 8 caused by the long stroke of the discharge valve 82. As a result, the fuel discharged to the discharge valve chamber 1*d* can be prevented from flowing back into the pressurizing chamber 11 again, and a decrease in the efficiency of the high-pressure fuel supply pump 100 can be suppressed. In this manner, the discharge valve mechanism 8 serves as a check valve that restricts the flow direction of the fuel.

The body 1 is provided with the relief valve mechanism 4 communicating with the pressurizing chamber 11. The relief valve mechanism 4 includes a relief spring 41, a relief valve holder 42, a relief valve 43, a seat member 44, and a spring support member 45.

The seat member 44 includes the relief spring 41 and forms a relief valve chamber. One end portion of the relief spring 41 abuts on the spring support member 45, and the other end portion thereof abuts on the relief valve holder 42. The relief valve holder 42 is engaged with the relief valve 43. The biasing force of the relief spring 41 acts on the relief valve 43 via the relief valve holder 42.

The relief valve 43 is pressed by the biasing force of the relief spring 41 to close the fuel passage of the seat member 44. The fuel passage of the seat member 44 communicates with the discharge passage if (see FIG. 3). Movement of fuel between the pressurizing chamber 11 (upstream side) and the seat member 44 (downstream side) is blocked by contact (close contact) of the relief valve 43 with the seat member 44.

When the pressure in the common rail 106 or a member beyond the common rail increases, the fuel on the seat member 44 side presses the relief valve 43 to move the relief valve 43 against the biasing force of the relief spring 41. As a result, the relief valve 43 is opened, and the fuel in the discharge passage if returns to the pressurizing chamber 11 through the fuel passage of the seat member 44. Therefore, the pressure for opening the relief valve 43 is determined by the biasing force of the relief spring 41.

The relief valve mechanism 4 of the present embodiment communicates with the pressurizing chamber 11, but is not limited thereto. For example, the relief valve mechanism 4 may communicate with a low-pressure passage (the low-pressure fuel suction port 51, the suction passage 10*b*, or the like).

[Electromagnetic Suction Valve Mechanism]

Next, the electromagnetic suction valve mechanism 3 will be described with reference to FIGS. 5 and 6.

Figure 5:
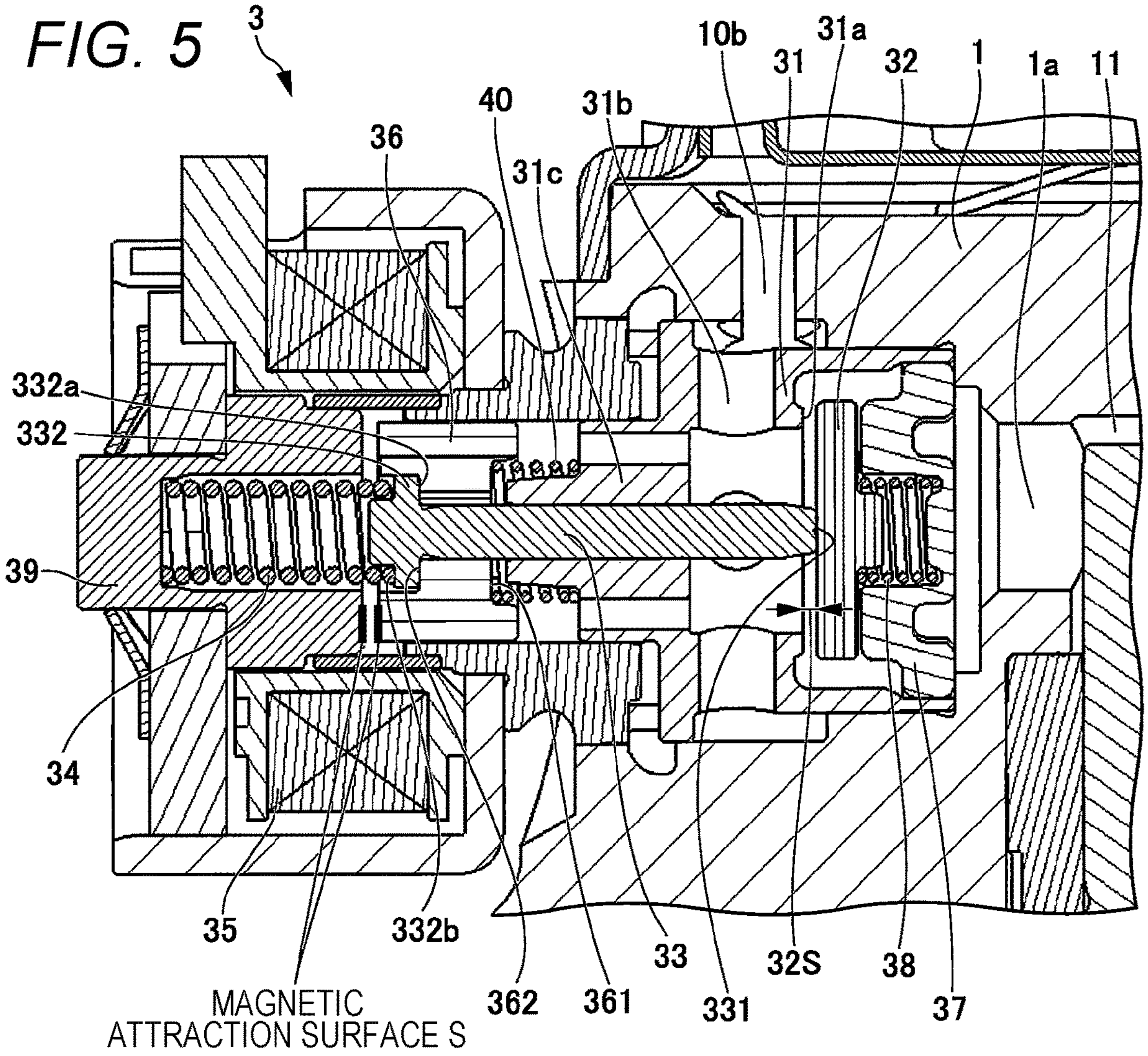
FIG. 5 is an enlarged longitudinal cross-sectional view of an electromagnetic suction valve mechanism of the high-pressure fuel supply pump according to the first embodiment of the present invention.
Figure 6:
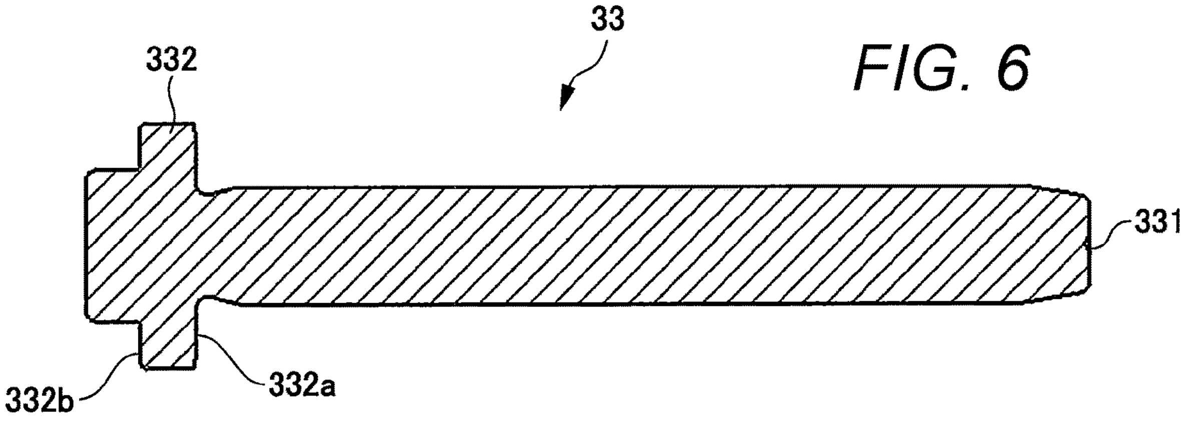
FIG. 6 is a cross-sectional view of a rod in the electromagnetic suction valve mechanism of the high-pressure fuel supply pump according to the first embodiment of the present invention.

FIG. 5 is an enlarged longitudinal cross-sectional view of the electromagnetic suction valve mechanism 3 of the high-pressure fuel supply pump 100, and illustrates a valve opening state of the electromagnetic suction valve mechanism 3. FIG. 6 is a cross-sectional view of a rod in the electromagnetic suction valve mechanism 3.

As illustrated in FIG. 5, the electromagnetic suction valve mechanism 3 is inserted into a lateral hole formed in the body 1. The electromagnetic suction valve mechanism 3 includes a suction valve seat 31 press-fitted into a lateral hole formed in the body 1, a suction valve (valve body) 32, a rod 33, a rod biasing spring 34, an electromagnetic coil 35, and an anchor 36.

The suction valve seat 31 is formed in a tubular shape, and a seating portion 31*a* is provided on an inner peripheral portion. The suction port 31*b* that reaches the inner peripheral portion from the outer peripheral portion is formed in the suction valve seat 31. The suction port 31*b* communicates with the suction passage 10*b* in the low-pressure fuel chamber 10 described above. The suction valve seat 31 has a rod guide 31*c* through which the rod 33 passes.

A stopper 37 facing the seating portion 31*a* of the suction valve seat 31 is disposed in the lateral hole formed in the body 1. The suction valve 32 is disposed between the stopper 37 and the seating portion 31*a*. A valve biasing spring 38 is interposed between the stopper 37 and the suction valve 32.

The valve biasing spring 38 biases the suction valve 32 toward the seating portion 31*a* side.

The suction valve 32 abuts on the seating portion 31*a* to close the communication portion between the suction port 31*b* and the pressurizing chamber 11. When the suction valve 32 closes the communication portion between the suction port 31*b* and the pressurizing chamber 11, the electromagnetic suction valve mechanism 3 is closed. The suction valve 32 abuts on the stopper 37 to open the communication portion between the suction port 31*b* and the pressurizing chamber 11. When the suction valve 32 opens the communication portion between the suction port 31*b* and the pressurizing chamber 11, the electromagnetic suction valve mechanism 3 is opened.

The rod 33 passes through the rod guide 31*c* of the suction valve seat 31 and the anchor 36. As illustrated in FIG. 6, a contact surface 331 in contact with the suction valve 32 is formed at one axial end of the rod 33. A flange 332 is formed on the other end side in the axial direction of the rod 33. The flange 332 has a first contact surface 332*a* facing the suction valve 32 side and a second contact surface 332*b* opposite to the first contact surface 332*a*.

The second contact surface 332*b* of the flange 332 is engaged with one end of the rod biasing spring 34.

The other end of the rod biasing spring 34 is engaged with the fixed core 39 disposed so as to surround the rod biasing spring 34. The rod biasing spring 34 biases the suction valve 32 in the valve opening direction which is the stopper 37 side via the rod 33.

The anchor 36 is formed in a substantially cylindrical shape. At one end of the anchor 36 in the axial direction, a spring abutment portion 361 on which one end of an anchor biasing spring 40 abuts is formed. The other end of the anchor 36 in the axial direction faces the end surface of the fixed core 39. At the other end in the axial direction of the anchor 36, a flange abutment portion 362 on which the first contact surface 332*a* of the flange 332 of the rod 33 abuts is formed.

The other end of the anchor biasing spring 40 abuts on the rod guide 31*c*. The anchor biasing spring 40 biases the anchor 36 toward the flange 332 side of the rod 33. A movable distance of the anchor 36 is set to be longer than a movable distance of the suction valve 32. As a result, the suction valve 32 can reliably abut (seat on) the seating portion 31*a*, and the electromagnetic suction valve mechanism 3 can be reliably brought into a valve closing state.

The electromagnetic coil 35 is disposed around the fixed core 39. A terminal member 30 (see FIG. 2) is electrically connected to the electromagnetic coil 35. A current flows through the electromagnetic coil 35 via the terminal member 30. In a non-energized state in which no current flows through the electromagnetic coil 35, the rod 33 is biased in the valve opening direction by the biasing force of the rod biasing spring 34, and presses the suction valve 32 in the valve opening direction. As a result, the suction valve 32 is separated from the seating portion 31*a* and abuts on the stopper 37, and the electromagnetic suction valve mechanism 3 is in the valve open state. That is, the electromagnetic suction valve mechanism 3 is a normally open type mechanism that opens in a non-energized state.

In the open state of the electromagnetic suction valve mechanism 3, the fuel in the suction port 31*b* passes between the suction valve 32 and the seating portion 31*a*, and flows into the pressurizing chamber 11 through a plurality of fuel passing holes (not illustrated) of the stopper 37 and the suction passage 1*a*. Since the suction valve 32 comes into contact with the stopper 37 in the valve open state of the electromagnetic suction valve mechanism 3, the position of the suction valve 32 in the valve opening direction is restricted. In the valve open state of the electromagnetic suction valve mechanism 3, the gap existing between the suction valve 32 and the seating portion 31*a* is a movable range of the suction valve 32, which is a valve opening stroke 32S.

When a current flows through the electromagnetic coil 35, a magnetic attraction force is generated in a magnetic attraction surfaces S of each of the anchor 36 and the fixed core 39. Therefore, the electromagnetic coil 35, the anchor 36, and the fixed core 39 constitute a magnetic attraction force generation unit according to the present invention. When the magnetic attraction force is generated on the magnetic attraction surface S, the anchor 36 is attracted to the fixed core 39. As a result, the anchor 36 moves against a biasing force of the rod biasing spring 34 and comes into contact with the fixed core 39.

When the anchor 36 moves in the valve closing direction on the fixed core 39 side, the rod 33 with which the anchor 36 is engaged moves together with the anchor 36. As a result, the suction valve 32 is released from the biasing force in the valve opening direction, and moves in the valve closing direction by the biasing force of the valve biasing spring 38. When the suction valve 32 comes into contact with the seating portion 31*a* of the suction valve seat 31, the electromagnetic suction valve mechanism 3 is closed.

[Operation of High-Pressure Fuel Supply Pump]

Next, the operation of the high-pressure fuel supply pump according to the present embodiment will be described.

In a case where the cam 91 illustrated in FIG. 2 rotates and the plunger 2 descends, when the electromagnetic suction valve mechanism 3 is opened, the fuel flows from the suction passage 1*a* into the pressurizing chamber 11. Hereinafter, a stroke in which the plunger 2 descends is referred to as a suction stroke. Meanwhile, in a case where the plunger 2 ascends, when the electromagnetic suction valve mechanism 3 is closed, the fuel in the pressurizing chamber 11 is pressurized, passes through the discharge valve mechanism 8 (see FIG. 3), and is pressure-fed to the common rail 106 (see FIG. 1). Hereinafter, the process of raising the plunger 2 is referred to as a compression stroke.

As described above, when the electromagnetic suction valve mechanism 3 is closed during the compression stroke, the fuel flowing into the pressurizing chamber 11 during the suction stroke is pressurized and discharged to the common rail 106 side. Meanwhile, when the electromagnetic suction valve mechanism 3 is opened during the compression stroke, the fuel in the pressurizing chamber 11 is pushed back toward the suction passage 1*a* and is not discharged toward the common rail 106. In this manner, the fuel discharge by the high-pressure fuel supply pump 100 is operated by opening and closing the electromagnetic suction valve mechanism 3. The opening and closing of the electromagnetic suction valve mechanism 3 is controlled by the ECU 101.

In the suction stroke, the volume of the pressurizing chamber 11 increases, and the fuel pressure in the pressurizing chamber 11 decreases. In this suction stroke, when the fuel pressure in the pressurizing chamber 11 becomes lower than the pressure in the suction port 31*b* and the biasing force due to a differential pressure therebetween exceeds the biasing force by the valve biasing spring 38, the suction valve 32 is separated from the seating portion 31*a*, and the electromagnetic suction valve mechanism 3 is opened. As a result, the fuel passes between the suction valve 32 and the seating portion 31*a*, passes through a plurality of holes provided in the stopper 37, and flows into the pressurizing chamber 11.

After the suction stroke ends, the plunger 2 turns to the upward movement and moves to the compression stroke. In this case, the electromagnetic coil 35 remains in the non-energized state, and no magnetic attraction force acts between the anchor 36 and the fixed core 39. The rod biasing spring 34 is set to have a biasing force necessary and sufficient to maintain the suction valve 32 at the valve opening position away from the seating portion 31*a* in the non-energized state.

In this state, even when the plunger 2 moves upward, the rod 33 remains at the valve opening position, so that the suction valve 32 biased by the rod 33 also remains at the valve opening position. Therefore, the volume of the pressurizing chamber 11 decreases with the upward movement of the plunger 2, but in this state, the fuel once flowing into the pressurizing chamber 11 is returned to the suction passage 10*b* through the electromagnetic suction valve mechanism 3 in the valve open state again, and the pressure in the pressurizing chamber 11 does not increase. This stroke is referred to as a return stroke.

In the return process, when a control signal from the ECU 101 (see FIG. 1) is applied to the electromagnetic suction valve mechanism 3, a current flows through the electromagnetic coil 35 via the terminal member 30. When a current flows through the electromagnetic coil 35, a magnetic attraction force acts on the magnetic attraction surfaces S of the fixed core 39 and the anchor 36, and the anchor 36 is attracted to the fixed core 39. When the magnetic attraction force becomes larger than the biasing force of the rod biasing spring 34, the anchor 36 moves toward the fixed core 39 side against the biasing force of the rod biasing spring 34, and the rod 33 engaged with the anchor 36 moves in a direction away from the suction valve 32. As a result, the suction valve 32 is seated on the seating portion 31*a* by the biasing force of the valve biasing spring 38 and the fluid force caused by the fuel flowing into the suction passage 10*b*, and the electromagnetic suction valve mechanism 3 is closed.

After the electromagnetic suction valve mechanism 3 is closed, the fuel in the pressurizing chamber 11 is pressurized as the plunger 2 ascends, and when the pressure becomes equal to or higher than the pressure of the fuel discharge port 12*a* (see FIG. 3), the fuel passes through the discharge valve mechanism 8 and is discharged to the common rail 106 (see FIG. 1). This stroke is referred to as a discharge stroke. That is, the compression stroke between a bottom dead center and a top dead center of the plunger 2 includes the return stroke and the discharge stroke. The amount of fuel to be discharged can be controlled by controlling the timing of energizing the electromagnetic coil 35 of the electromagnetic suction valve mechanism 3.

When the timing of energizing the electromagnetic coil 35 is made earlier, a ratio of the return stroke during the compression stroke decreases, and a ratio of the discharge stroke increases. As a result, the amount of fuel returned to the suction passage 10*b* decreases, and the amount of fuel discharged at high pressure increases. Meanwhile, when the timing of energizing the electromagnetic coil 35 is delayed, the ratio of the return stroke during the compression stroke increases, and the ratio of the discharge stroke decreases. As a result, the amount of fuel returned to the suction passage 10*b* increases, and the amount of fuel discharged at a high pressure decreases. As described above, by controlling the timing of energizing the electromagnetic coil 35, the amount of fuel discharged at high pressure can be controlled to an amount required by the engine (internal combustion engine).

[Low Friction Portion of Rod]

Next, the low friction portion provided on the rod 33 will be described with reference to FIG. 7.

Figure 7:
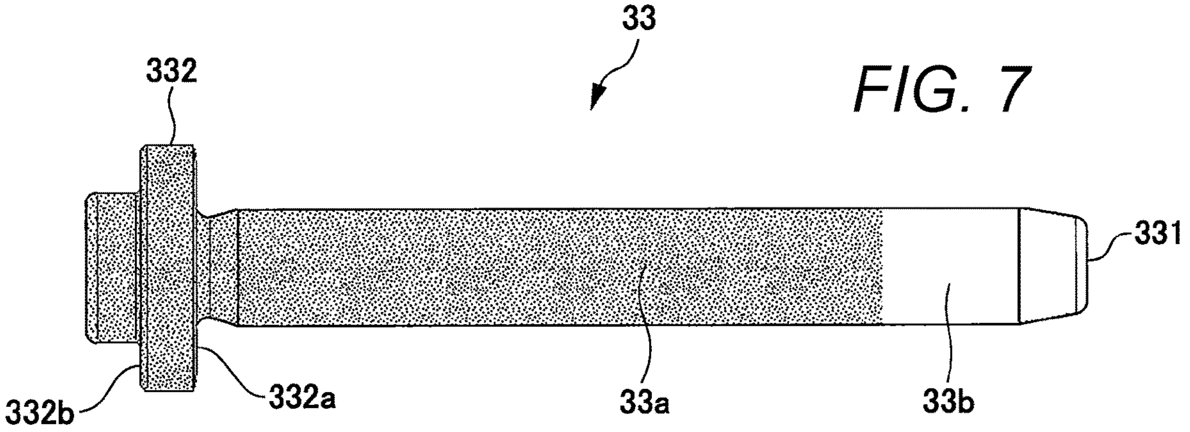
FIG. 7 is a side view of the rod in the electromagnetic suction valve mechanism of the high-pressure fuel supply pump according to the first embodiment of the present invention.

FIG. 7 is a side view of the rod in the electromagnetic suction valve mechanism 3.

As illustrated in FIG. 7, a low friction portion 33*a* and a non-low friction portion 33*b* are formed on the surface of the rod 33. The low friction portion 33*a* and the non-low friction portion 33*b* are adjacent to each other in the axial direction of the rod 33. The low friction portion 33*a* is set in a range exceeding the central portion from the other end in the axial direction of the rod 33. The non-low friction portion 33*b* includes one end in the axial direction of the rod 33.

The low friction portion 33*a* includes a first contact surface 332*a* and a second contact surface 332*b* of the flange 332. As a result, the low friction portion 33*a* comes into contact with the rod biasing spring 34 and the anchor 36. The low friction portion 33*a* includes most of the region closer to the contact surface 331 side than the flange 332. As a result, the low friction portion 33*a* comes into contact with an inner peripheral surface of the anchor 36 and the rod guide 31*c*.

For example, when an axial center of the anchor 36 completely coincides with an axial center of the rod 33, a slight gap is generated between the inner peripheral surface of the anchor 36 and the outer peripheral surface of the rod 33, so that the inner peripheral surface of the anchor 36 and the outer peripheral surface of the rod 33 do not come into contact with each other. However, when the axial center of the anchor 36 and the axial center of the rod 33 do not completely coincide with each other, the rod 33 moves in the axial direction while being in contact with a part of the inner peripheral surface of the anchor 36. That is, the rod 33 slides on the inner peripheral surface of the anchor 36.

The anchor 36 may be biased in one direction in the radial direction and the rotation thereof may be suppressed under the influence of the magnetic attraction force generated between the anchor and the fixed core 39. In this case, since the axial center of the anchor 36 and the axial center of the rod 33 do not completely coincide with each other, the same portion on the inner peripheral surface of the anchor 36 comes into contact with the outer peripheral surface of the rod 33.

In addition, the axial center of the rod guide 31*c* and the axial center of the rod 33 may not completely coincide with each other due to variations in dimensions of the rod guide 31*c*, variations in dimensions of a lateral hole in the body 1 in which the electromagnetic suction valve mechanism 3 is disposed, and the like. In this case, the same portion on the inner peripheral surface of the rod guide 31*c* comes into contact with the outer peripheral surface of the rod 33.

Meanwhile, the rod 33 generates a propulsive force (hereinafter, referred to as "rotational propulsive force") in the rotation direction about the axis due to contact with or collision with another component. For example, the rotational propulsive force is generated in the rod 33 when the biasing force by the rod biasing spring 34 is transmitted to the rod 33. Further, when the contact surface 331 collides with the suction valve 32, the rotational propulsive force is generated in the rod 33.

The low friction portion 33*a* is set to have a friction coefficient such that the frictional force generated between the anchor 36 in contact with the rod 33, the rod biasing spring 34, and the rod guide 31*c* is lower than the rotational propulsive force of the rod 33. Examples of a method of providing the low friction portion 33*a* include surface treatment such as plating, coating, and polishing. As a method of the coating, for example, diamond-like carbon (DLC) coating can be mentioned.

By providing the low friction portion 33*a*, the rod 33 is not prevented from rotating around the axis. Therefore, the rod 33 moves in the axial direction while rotating around the axis. As a result, the rod 33 can be prevented from always contacting the same portion of the rod biasing spring 34, the anchor 36, and the rod guide 31*c*, and wear of the rod 33, the anchor 36, and the like can be dispersed in the circumferential direction. As a result, the life of the rod 33 and the anchor 36 can be prolonged.

Since the anchor 36 needs to select a material through which the magnetic flux passes, it is difficult to apply a material that is hardly worn. Therefore, dispersing the wear of the anchor 36 in the circumferential direction greatly contributes to an increase in the life of the anchor 36.

In addition, in one of the components that come into contact with each other, the other component may be fitted to the worn and scuffed portion, so that the progress of wear may be accelerated. However, in the present embodiment, by providing the low friction portion 33*a*, the rod 33 is prevented from sliding on the same portion of the rod biasing spring 34, the anchor 36, and the rod guide 31*c*, so that uneven wear in which a portion is worn can be suppressed.

The rod 33 has the non-low friction portion 33*b*. Accordingly, the non-low friction portion 33*b* can be gripped by a fixing jig during the surface treatment. When the surface treatment cannot be applied to the entire surface of the rod 33, it is effective to provide a non-low friction portion. The low friction portion according to the present invention may be provided on the entire surface of the rod 33.

In the present embodiment, the first contact surface 332*a* in contact with the flange abutment portion 362 of the anchor 36 and the second contact surface 332*b* in contact with one end of the rod biasing spring 34 are defined as the low friction portion 33*a*.

Further, the outer peripheral surface of the flange 332 in contact with the anchor 36 and the outer peripheral surface of the rod 33 in contact with the anchor 36 and the inner peripheral surface of the rod guide 31*c* are defined as a low friction portion 33*a*.

However, the low friction portion according to the present invention may be provided on at least a part of a portion of the rod 33 in contact with another component. That is, in the electromagnetic suction valve mechanism according to the present invention, the low friction portion may be provided only in a portion where a frictional force larger than the rotational propulsive force of the rod is generated or is likely to be generated when the non-low friction portion is provided.

In addition, the low friction portion according to the present invention may be provided on a rod contact component with which the rod 33 comes into contact. That is, the low friction portion may be provided on the rod contact component such as the rod biasing spring 34, the anchor 36, the anchor biasing spring 40, and the rod guide 31*c*. For example, in a case where the anchor biasing spring 40 is provided with the low friction portion, the frictional force generated between the anchor biasing spring 40 and the anchor 36 is set to be lower than the rotational propulsive force of the anchor 36. As a result, the anchor 36 in a case where the magnetic attraction force is not generated can be rotated. In addition, the low friction portion according to the present invention may be provided on both the rod and the rod contact component.

2. Second Embodiment

Next, an electromagnetic suction valve mechanism according to a second embodiment of the present invention will be described with reference to FIG. 8.

Figure 8:
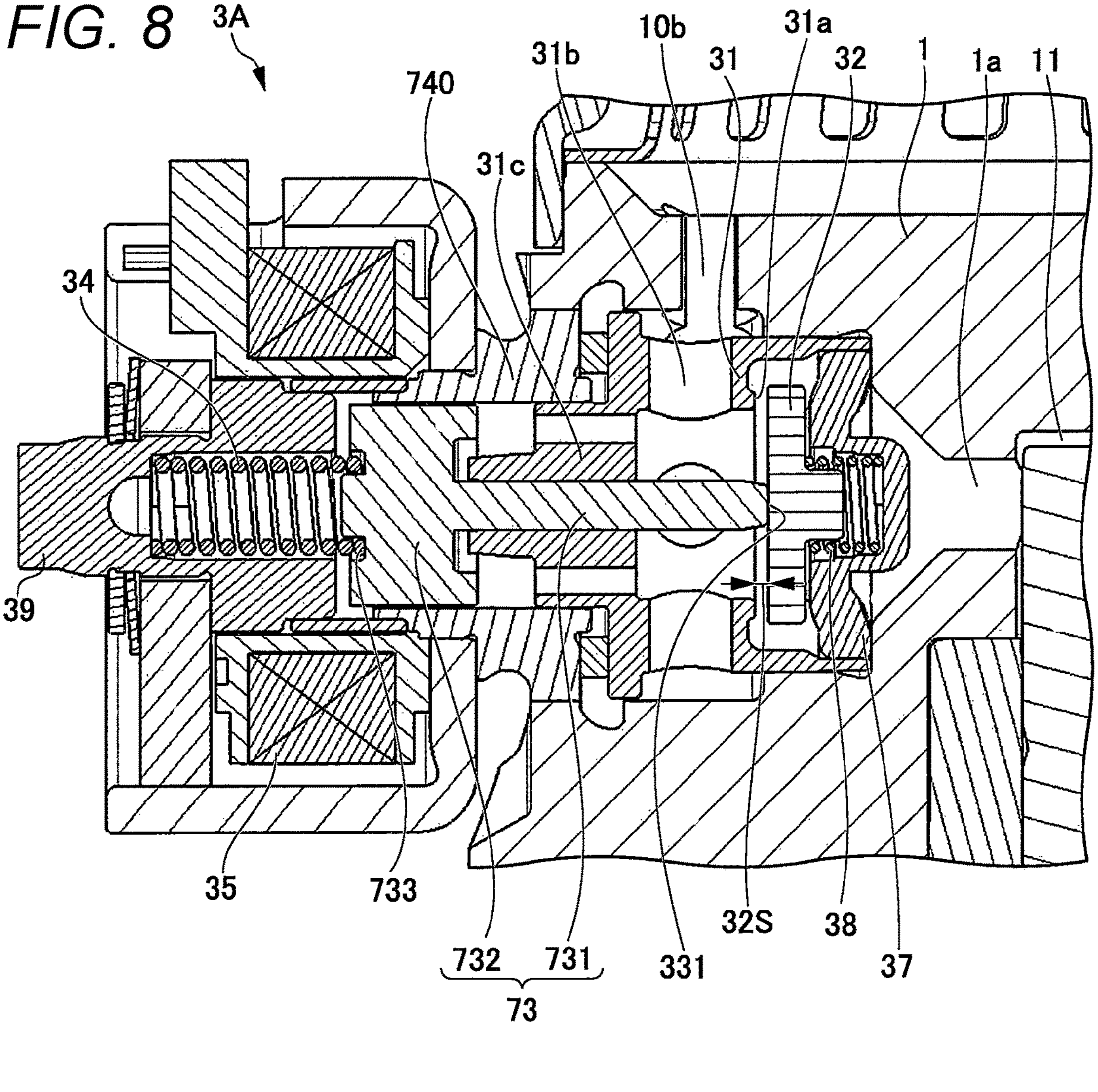
FIG. 8 is an enlarged longitudinal cross-sectional view of an electromagnetic suction valve mechanism of a high-pressure fuel supply pump according to a second embodiment of the present invention.

FIG. 8 is an enlarged longitudinal cross-sectional view of the electromagnetic suction valve mechanism according to the second embodiment.

A high-pressure fuel supply pump according to the second embodiment has the same configuration as the high-pressure fuel supply pump 100 according to the first embodiment. The high-pressure fuel supply pump according to the second embodiment is different from the high-pressure fuel supply pump 100 according to the first embodiment in an electromagnetic suction valve mechanism 3A. Therefore, the electromagnetic suction valve mechanism 3A will be described here, and the description of the configuration common to the high-pressure fuel supply pump 100 will be omitted.

[Electromagnetic Suction Valve Mechanism]

As illustrated in FIG. 8, the electromagnetic suction valve mechanism 3A is inserted into a lateral hole formed in the body 1. The electromagnetic suction valve mechanism 3A includes a suction valve seat 31 press-fitted into the lateral hole formed in the body 1, a suction valve 32, an anchor rod 73, a rod biasing spring 34, and an electromagnetic coil 35.

The anchor rod 73 is formed of a material through which a magnetic flux passes. The anchor rod 73 includes a rod body 731 passing through the rod guide 31*c* of the suction valve seat 31, and an anchor portion 732 formed integrally with the rod body 731. A contact surface 331 in contact with the suction valve 32 is formed at one axial end of the rod body 731. The anchor portion 732 is continuous with the other end of the rod body 731 in the axial direction.

The anchor portion 732 is formed in a substantially columnar shape. One end of the anchor portion 732 in the axial direction faces the rod guide 31*c* with an appropriate distance. The other end of the anchor portion 732 in the axial direction faces the end surface of the fixed core 39. At the other end in the axial direction of the anchor portion 732, a spring abutment portion 733 with which one end of the rod biasing spring 34 abuts is formed. The anchor portion 732 is movably disposed in an outer core 740 joined to the body 1.

A low friction portion is formed in the spring abutment portion 733 of the anchor rod 73. The low friction portion is set to have a friction coefficient such that the frictional force generated between the low friction portion and the rod biasing spring 34 is lower than the rotational propulsive force of the anchor rod 73. As a result, the anchor rod 73 is not prevented from rotating about the axis. Therefore, the anchor rod 73 moves in the axial direction while rotating around the axis. As a result, the anchor rod 73 can be prevented from always contacting the same portion of the rod biasing spring 34 and the outer core 740, and wear of the anchor rod 73 can be dispersed in the circumferential direction. Accordingly, the life of the anchor rod 73 can be prolonged.

In the present embodiment, the low friction portion is provided only in the spring abutment portion 733 of the anchor rod 73. However, the low friction portion may be provided on an outer peripheral surface of the anchor portion 732 and an outer peripheral surface of the rod body 731. Note that a low friction portion may be provided on the entire surface of the anchor rod 73.

3. Third Embodiment

Next, an electromagnetic suction valve mechanism according to a third embodiment of the present invention will be described with reference to FIG. 9.

Figure 9:
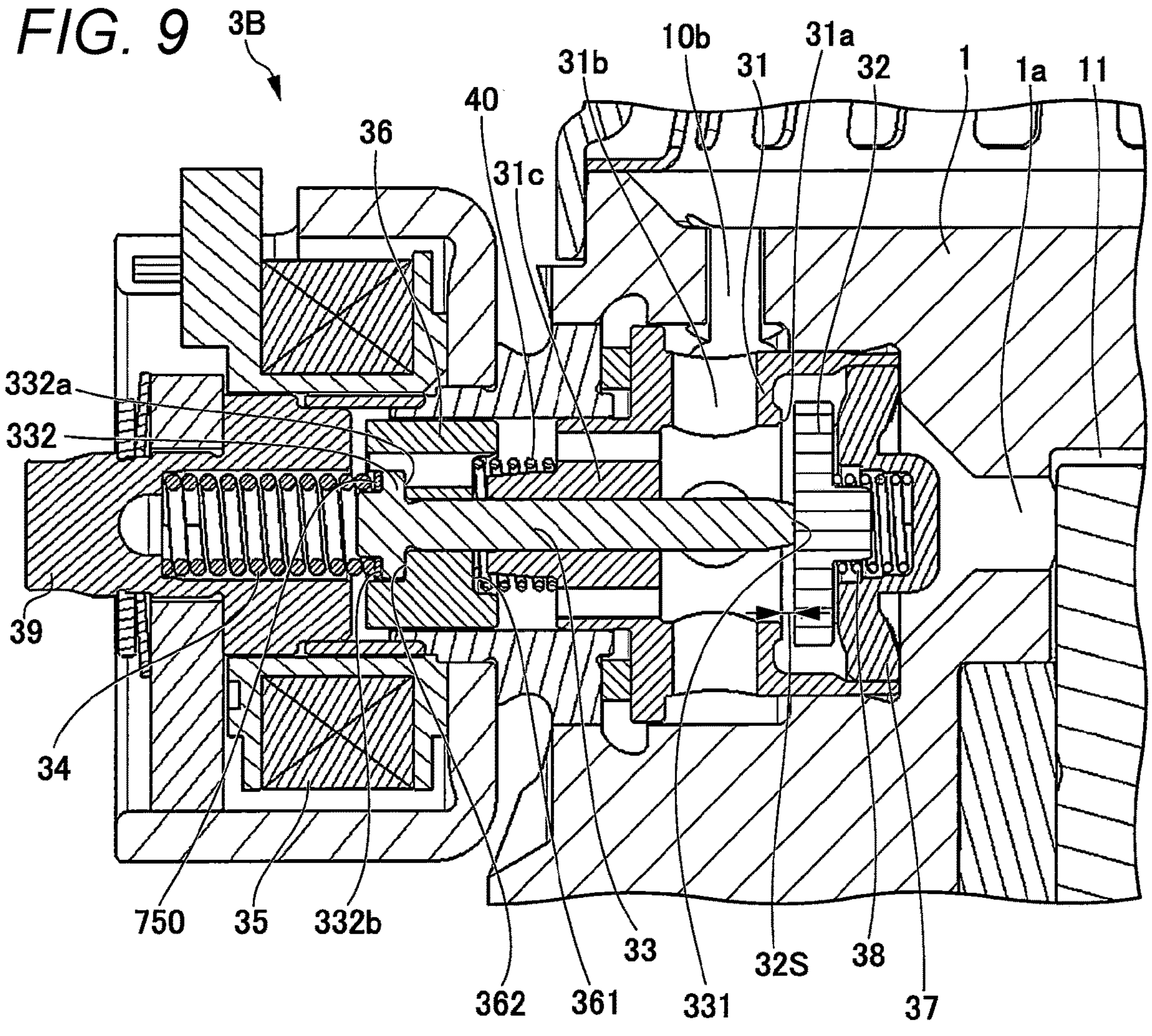
FIG. 9 is an enlarged longitudinal cross-sectional view of an electromagnetic suction valve mechanism of a high-pressure fuel supply pump according to a third embodiment of the present invention.

FIG. 9 is an enlarged longitudinal cross-sectional view of the electromagnetic suction valve mechanism according to the third embodiment.

A high-pressure fuel supply pump according to the third embodiment has the same configuration as the high-pressure fuel supply pump 100 according to the first embodiment. The high-pressure fuel supply pump according to the third embodiment is different from the high-pressure fuel supply pump 100 according to the first embodiment in an electromagnetic suction valve mechanism 3B. Therefore, the electromagnetic suction valve mechanism 3B will be described here, and the description of the configuration common to the high-pressure fuel supply pump 100 will be omitted.

[Electromagnetic Suction Valve Mechanism]

As illustrated in FIG. 9, the electromagnetic suction valve mechanism 3B is inserted into a lateral hole formed in the body 1. The electromagnetic suction valve mechanism 3 includes a suction valve seat 31 press-fitted into the lateral hole formed in the body 1, a suction valve 32, a rod 33, a rod biasing spring 34, an electromagnetic coil 35, an anchor 36, and a spacer 750.

A spacer 750 is formed in a ring shape. The spacer 750 is interposed between one end of the rod biasing spring 34 and the second contact surface 332*b* of the rod 33. A low friction portion is formed on a surface of the spacer 750 in contact with one end of the rod biasing spring 34. The low friction portion is set to have a friction coefficient such that the frictional force generated between the low friction portion and the rod biasing spring 34 is lower than the rotational propulsive force of the anchor rod 73.

As a result, the rod 33 is not prevented from rotating around the axis. Therefore, the rod 33 moves in the axial direction while rotating around the axis. As a result, the rod 33 can be prevented from always contacting the same portion of the rod biasing spring 34 and the anchor 36, and wear of the rod 33, the anchor 36, and the like can be dispersed in the circumferential direction. As a result, the life of the rod 33 and the anchor 36 can be prolonged. In addition, since the low friction portion is provided in the spacer 750 which is a component smaller than the rod 33 and the rod biasing spring 34, it is possible to reduce a region where surface treatment or the like is performed and to reduce cost.

The low friction portion may be provided on the surface of the spacer 750 in contact with the second contact surface 332*b* of the rod 33. The low friction portion may be provided on both surfaces (surface in contact with second contact surface 332*b* and surface in contact with rod biasing spring 34) of the spacer 750.

4. Summary

As described above, the electromagnetic suction valve mechanism 3 (electromagnetic valve mechanism) according to the first embodiment described above includes the suction valve 32 (valve body), the rod 33 (*rod*) engaged with the suction valve 32, and the magnetic attraction force generation unit that generates the magnetic attraction force for moving the rod 33 in the axial direction. The rod 33 is provided with a low friction portion 33*a* (low friction portion). The low friction portion 33*a* is set to have a friction coefficient such that the frictional force generated between the rod 33 and the rod biasing spring 34 and the like (rod contact component) is smaller than the rotational propulsive force of the rod 33.

As a result, the rod 33 is not prevented from rotating around the axis and moves in the axial direction while rotating around the axis. As a result, the rod 33 can be prevented from always contacting the same portion of the rod contact component such as the rod biasing spring 34, and wear of the rod 33 and the rod contact component can be dispersed in the circumferential direction. As a result, the life of the rod 33 and the rod contact component can be prolonged.

The magnetic attraction force generation unit of the electromagnetic suction valve mechanism 3 (electromagnetic valve mechanism) according to the first embodiment described above includes an anchor 36 (anchor) engaged with the rod 33 (*rod*), a fixed core 39 (fixed core) facing the anchor 36, and an electromagnetic coil 35 (coil) that generates a magnetic attraction force between the anchor 36 and the fixed core 39. The rod contact component is the anchor 36. As a result, the rod 33 can be prevented from always contacting the same portion of the rod contact component such as the anchor 36, and wear of the rod 33 and the anchor 36 can be dispersed in the circumferential direction. As a result, the life of the rod 33 and the anchor 36 can be prolonged.

In addition, the electromagnetic suction valve mechanism 3 (electromagnetic valve mechanism) according to the first embodiment described above includes a rod biasing spring 34 (rod biasing spring) that biases the rod 33 (*rod*) toward the suction valve 32 (valve body). The rod contact component is a rod biasing spring 34. As a result, the rod 33 can be prevented from always contacting the same portion of the rod contact component such as the rod biasing spring 34, and wear of the rod 33 and the rod contact component can be dispersed in the circumferential direction.

In addition, the electromagnetic suction valve mechanism 3 (electromagnetic valve mechanism) according to the first embodiment described above includes the rod guide 31*c* (rod guide) through which the rod 33 (*rod*) passes. The rod contact component is the rod guide 31*c*. As a result, the rod 33 can be prevented from always contacting the same portion of the rod contact component such as the rod guide 31*c*, and wear of the rod 33 and the rod contact component can be dispersed in the circumferential direction.

The low friction portion 33*a* (low friction portion) of the electromagnetic suction valve mechanism 3 (electromagnetic valve mechanism) according to the first embodiment described above is provided on the rod 33 (*rod*). The end portion of the rod 33 on the side in contact with the suction valve 32 (valve body) is the non-low friction portion 33*b* (non-low friction portion). As a result, the non-low friction portion 33*b* can be gripped by the fixing jig at the time of work (at the time of surface treatment) of providing the low friction portion 33*a*. As a result, the efficiency of the work of providing the low friction portion 33*a* can increase.

The magnetic attraction force generation unit of the electromagnetic suction valve mechanism 3A (electromagnetic valve mechanism) according to the second embodiment described above includes the anchor portion 732 (anchor) formed integrally with the rod body 731 (*rod*), the fixed core 39 (fixed core) facing the anchor portion 732, and the electromagnetic coil 35 (coil) that generates a magnetic attraction force between the anchor portion 732 and the fixed core 39. In addition, the electromagnetic suction valve mechanism 3A includes the rod biasing spring 34 (rod biasing spring) that abuts on the anchor portion 732 and biases the rod body 731 toward the suction valve 32 (valve body) side. The rod contact component is a rod biasing spring 34. As a result, it is possible to prevent the rod body 731 and the anchor portion 732 from always contacting the same portion of the rod contact component such as the rod biasing spring 34, and it is possible to disperse wear of the rod contact component such as the rod body 731, the anchor portion 732, and the rod biasing spring 34 in the circumferential direction.

The electromagnetic suction valve mechanism 3B (electromagnetic valve mechanism) according to the third embodiment described above includes the rod biasing spring 34 (rod biasing spring) that biases the rod 33 (*rod*) toward the suction valve 32 (valve body) side, and the spacer 750 (spacer) interposed between the rod 33 and the rod biasing spring 34. The rod contact component is the spacer 750, and the low friction portion is provided in the spacer 750. As a result, the rod 33 can be prevented from always contacting the same portion of the rod contact component such as the rod biasing spring 34, and wear of the rod 33 and the rod contact component can be dispersed in the circumferential direction. In addition, since the low friction portion is provided in the spacer 750 which is a component smaller than the rod 33 and the rod biasing spring 34, the region where the low friction portion is provided can be reduced, and the cost can be reduced.

In addition, the low friction portion according to the above-described embodiment is formed by performing plating or coating. Thus, the low friction portion can be easily provided.

The high-pressure fuel supply pump 100 (fuel pump) according to the first embodiment described above includes the body 1 (body) including the pressurizing chamber 11 (pressurizing chamber), and the electromagnetic suction valve mechanism 3 (electromagnetic valve mechanism) that discharges fuel to the pressurizing chamber 11. As a result, the rod 33 can be prevented from always contacting the same portion of the rod contact component such as the rod biasing spring 34, and wear of the rod 33 and the rod contact component can be dispersed in the circumferential direction.

The embodiments of the electromagnetic valve mechanism and the fuel pump of the present invention have been described above including the operational effects thereof. However, the electromagnetic valve mechanism and the fuel pump of the present invention are not limited to the above-described embodiments, and various modifications can be made without departing from the gist of the invention described in the claims.

In addition, the above-described embodiments have been described in detail in order to describe the present invention in an easy-to-understand manner, and are not necessarily limited to those having all the described configurations. Further, a part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment.

For example, in the second embodiment described above, the low friction portion is provided in the spring abutment portion 733 of the anchor rod 73. However, in the electromagnetic valve mechanism according to the present invention, the spacer 750 according to the third embodiment may be interposed between the spring abutment portion 733 and the rod biasing spring 34 without providing the low friction portion in the spring abutment portion 733. Even in this case, the anchor rod 73 can be prevented from always contacting the same portion of the rod biasing spring 34 and the outer core 740, and wear of the anchor rod 73 can be dispersed in the circumferential direction.

REFERENCE SIGNS LIST

1 body
2 plunger
3, 3A, 3B electromagnetic suction valve mechanism (electromagnetic valve mechanism)
4 relief valve mechanism
5 suction joint
6 cylinder
8 discharge valve mechanism
9 pressure pulsation reduction mechanism
10 low-pressure fuel chamber
11 pressurizing chamber
12 discharge joint
30 terminal member
31 suction valve seat
31*a* seating portion
31*b* suction port
31*c* rod guide
32 suction valve (valve body)
32S valve opening stroke
33 rod
33*a* low friction portion
33*b* non-low friction portion
35 electromagnetic coil
36 anchor
37 stopper
39 fixed core
73 anchor rod
91 cam
100 high-pressure fuel supply pump
101 ECU
102 a feed pump;
103 fuel tank
104 low-pressure pipe
105 fuel pressure sensor
106 common rail
107 injector
331 contact surface
332 flange
332*a* first contact surface
332*b* second contact surface
361 spring abutment portion
362 flange abutment portion
731 rod body
732 anchor portion
733 spring abutment portion
740 outer core
750 spacer

The invention claimed is:

1. An electromagnetic valve mechanism comprising:
a valve body;
a rod that engages with the valve body; and
a magnetic attraction force generation unit that generates a magnetic attraction force for moving the rod in an axial direction, wherein
the rod and a rod contact component in contact with the rod is provided with a low friction portion and a non-low friction portion, and
the low friction portion is set to a friction coefficient such that a frictional force generated between the rod and the rod contact component is smaller than a rotational propulsive force of the rod, and
the non-low friction portion includes an end portion of the rod on a side in contact with the valve body.

2. The electromagnetic valve mechanism according to claim 1, wherein
the magnetic attraction force generation unit includes an anchor that engages with the rod, a fixed core facing the anchor, and a coil that generates a magnetic attraction force between the anchor and the fixed core, and
the rod contact component is the anchor.

3. The electromagnetic valve mechanism according to claim 1, further comprising a rod biasing spring that biases the rod toward a side of the valve body, wherein
the rod contact component is the rod biasing spring.

4. The electromagnetic valve mechanism according to claim 1, further comprising a rod guide through which the rod passes, wherein
the rod contact component is the rod guide.

5. The electromagnetic valve mechanism according to claim 1, wherein
the low friction portion is provided on the rod.

6. The electromagnetic valve mechanism according to claim 1, wherein
the magnetic attraction force generation unit includes an anchor formed integrally with the rod, a fixed core facing the anchor, and a coil that generates a magnetic attraction force between the anchor and the fixed core,
the electromagnetic valve mechanism further includes a rod biasing spring that abuts on the anchor and biases the rod toward a side of the valve body, and
the rod contact component is the rod biasing spring.

7. The electromagnetic valve mechanism according to claim 1, further comprising:
a rod biasing spring that biases the rod toward a side of the valve body; and
a spacer interposed between the rod and the rod biasing spring, wherein
the rod contact component is the spacer, and
the low friction portion is provided in the spacer.

8. The electromagnetic valve mechanism according to claim 1, wherein the low friction portion is formed by plating or coating.

9. A fuel pump comprising:
a body that includes a pressurizing chamber;
a plunger that is supported by the body in a reciprocating manner and increases or decreases a capacity of the pressurizing chamber by a reciprocating movement; and
an electromagnetic valve mechanism that includes a valve body, a rod engaged with the valve body, and a magnetic attraction force generation unit that generates a magnetic attraction force for moving the rod in an axial direction, wherein
the rod and a rod contact component in contact with the rod is provided with a low friction portion and a non-low friction portion, and
the low friction portion is set to a friction coefficient such that a frictional force generated between the rod and the rod contact component is smaller than a rotational propulsive force of the rod, and the non-low friction portion includes an end portion of the rod on a side in contact with the valve body.

* * * * *